(12) United States Patent
Yang et al.

(10) Patent No.: US 11,946,755 B2
(45) Date of Patent: Apr. 2, 2024

(54) ONLINE RIDE-HAILING AND INVOICE ISSUING METHOD, SYSTEM AND APPARATUS

(71) Applicant: BEIJING AUTONAVI YUNMAP TECHNOLOGY CO., LTD., Beijing (CN)

(72) Inventors: Shaohang Yang, Beijing (CN); Yao Tong, Beijing (CN); Guang Yang, Beijing (CN); Yonghao Zhang, Beijing (CN); Linya Zhou, Beijing (CN); Xinhua Li, Beijing (CN)

(73) Assignee: BEIJING AUTONAVI YUNMAP TECHNOLOGY CO., LTD., Beijing (CN)

( * ) Notice: Subject to any disclaimer, the term of this patent is extended or adjusted under 35 U.S.C. 154(b) by 354 days.

(21) Appl. No.: 17/317,634

(22) Filed: May 11, 2021

(65) Prior Publication Data

US 2021/0262812 A1    Aug. 26, 2021

Related U.S. Application Data

(63) Continuation of application No. PCT/CN2019/106758, filed on Sep. 19, 2019.

(30) Foreign Application Priority Data

Nov. 12, 2018 (CN) .......................... 201811341981.0

(51) Int. Cl.
*G06Q 50/30* (2012.01)
*G01C 21/34* (2006.01)
*G01C 21/36* (2006.01)

(52) U.S. Cl.
CPC ..... *G01C 21/3438* (2013.01); *G01C 21/3617* (2013.01)

(58) Field of Classification Search
None
See application file for complete search history.

(56) References Cited

U.S. PATENT DOCUMENTS

| 7,355,510 B2 * | 4/2008 | Rockett .................. B60R 25/00 455/457 |
| 9,534,912 B2 | 1/2017 | Richard et al. |

(Continued)

FOREIGN PATENT DOCUMENTS

| CN | 104463509 A |   | 3/2015 |
| CN | 104463509 A | * | 3/2015 |

(Continued)

OTHER PUBLICATIONS

Written Opinion of the International Searching Authority and International Search Report for PCT Application No. PCT/ CN2019/ 106758 dated Nov. 28, 2019.

(Continued)

*Primary Examiner* — Vivek D Koppikar
*Assistant Examiner* — Kai Wang

(57) ABSTRACT

Online ride-hailing and invoice issuing methods, systems and apparatuses are provided. An example method comprises: receiving a first ride-hailing request from a user terminal, wherein the first ride-hailing request includes one or more transport capacity types, one or more online ride-hailing service providers providing the corresponding one or more transport capacity types, a start location and a destination location; sending one or more second ride-hailing requests to one or more online ride-hailing service platforms corresponding to the one or more online ride-hailing service providers according to the one or more transport capacity types and the one or more online ride-hailing service providers; receiving one or more second ride-hailing response messages returned by one or more of the one or more online ride-hailing service platforms; and returning a first ride- (Continued)

hailing message to the user terminal based on the second one or more ride-hailing response messages.

11 Claims, 14 Drawing Sheets

(56) References Cited

U.S. PATENT DOCUMENTS

| | | | |
|---|---|---|---|
| 10,027,805 B2* | 7/2018 | Husain | H04M 3/5183 |
| 10,254,119 B2 | 4/2019 | Wang et al. | |
| 10,375,526 B2* | 8/2019 | Sandel | H04M 1/00 |
| 10,455,076 B1* | 10/2019 | Kapadia | H04W 4/44 |
| 10,458,801 B2 | 10/2019 | Richard et al. | |
| 10,467,561 B2* | 11/2019 | Haparnas | G06Q 10/06311 |
| 10,671,961 B2 | 6/2020 | Cao | |
| 10,963,820 B2* | 3/2021 | Shelby | G06Q 10/02 |
| 10,997,857 B2 | 5/2021 | Ye et al. | |
| 2003/0135458 A1* | 7/2003 | Tadano | G06Q 10/02 |
| | | | 705/40 |
| 2013/0226627 A1* | 8/2013 | Kubovcik | G06Q 10/02 |
| | | | 705/5 |
| 2014/0172727 A1* | 6/2014 | Abhyanker | G06Q 30/0645 |
| | | | 705/307 |
| 2015/0325128 A1 | 11/2015 | Richard et al. | |
| 2016/0364812 A1 | 12/2016 | Cao | |
| 2016/0364823 A1 | 12/2016 | Cao | |
| 2017/0052034 A1* | 2/2017 | Magazinik | G06Q 10/047 |
| 2017/0364890 A1* | 12/2017 | Malhotra | G06Q 20/322 |
| 2018/0032928 A1 | 2/2018 | Li et al. | |
| 2018/0108103 A1 | 4/2018 | Li et al. | |
| 2018/0174265 A1 | 6/2018 | Liu et al. | |
| 2018/0189918 A1 | 7/2018 | Lu | |
| 2018/0204179 A1* | 7/2018 | Zeng | G01C 21/3438 |

FOREIGN PATENT DOCUMENTS

| | | | | |
|---|---|---|---|---|
| CN | 105225275 A | | 1/2016 | |
| CN | 105225275 A | * | 1/2016 | |
| CN | 106339220 A | | 1/2017 | |
| CN | 106778216 A | | 5/2017 | |
| CN | 106778216 A | * | 5/2017 | |
| CN | 106910088 A | | 6/2017 | |
| CN | 107516256 A | * | 12/2017 | G06Q 30/0635 |
| CN | 107516256 A | | 12/2017 | |
| CN | 107634977 A | | 1/2018 | |
| CN | 107767233 A | * | 3/2018 | |
| CN | 107767233 A | | 3/2018 | |
| CN | 107920096 A | * | 4/2018 | G06Q 10/04 |
| CN | 107920096 A | | 4/2018 | |
| CN | 108038774 A | | 5/2018 | |
| CN | 108038774 A | * | 5/2018 | G06Q 10/02 |
| CN | 108182037 A | * | 6/2018 | G06F 3/1203 |
| CN | 108182037 A | | 6/2018 | |

OTHER PUBLICATIONS

International Preliminary Report on Patentability Chapter I for PCT Application No. PCT/CN2019/106758 dated May 20, 2021.
First Search for Chinese Application No. 201811341981.0 dated Sep. 22, 2022.

* cited by examiner

ONLINE RIDE-HAILING AND INVOICE ISSUING METHOD, SYSTEM AND APPARATUS

CROSS-REFERENCE TO RELATED APPLICATIONS

This application is a continuation application of International Application No. PCT/CN2019/106758, filed with China National Intellectual Property Administration ("CNIPA") on Sep. 19, 2019, and entitled "ONLINE RIDE-HAILING AND INVOICE ISSUING METHOD, SYSTEM AND APPARATUS," which is based on and claims priority to and benefits of Chinese Patent Application No. 201811341981.0, filed on Nov. 12, 2018. The entire content of all of the above-identified applications is incorporated herein by reference.

TECHNICAL FIELD

This specification relates to the field of online ride-hailing technologies, and in particular, to an online ride-hailing and invoice issuing method, system, and apparatus.

BACKGROUND

With the development of mobile Internet technologies, a traveling user is increasingly accustomed to calling or reserving a vehicle using online ride-hailing applications. However, there can be many service providers providing online ride-hailing services, and each service provider can provide the user with more than one vehicle type for calling or reserving.

Currently, a service provider usually provides an online ride-hailing service for a user using an online ride-hailing application of the service provider, and the user may call or reserve only those vehicles operating on a platform of the service provider, and the user may do so by using the online ride-hailing application provided by the service provider. If the user cannot call any vehicle using the online ride-hailing application from the service provider, the user needs to open online ride-hailing application from another service provider to call or reserve a vehicle again. Such a ride-hailing experience increases ride-hailing operation costs of the user and causes inconvenience to the user.

SUMMARY

The specification is intended to provide an online ride-hailing method, system, and apparatus to overcome the foregoing problem or at least partially resolve the foregoing problem.

Embodiments of the specification provide an online ride-hailing method, including: receiving, by a server, a first ride-hailing request sent by a user terminal, wherein the first ride-hailing request includes one or more transport capacity types, one or more online ride-hailing service providers providing the one or more transport capacity types, a ride-hailing start location, and a ride-hailing destination location; sending, by the server, one or more second ride-hailing requests to one or more online ride-hailing service platforms corresponding to the one or more online ride-hailing service providers according to the one or more transport capacity types and the one or more online ride-hailing service providers, wherein the each of the one or more second ride-hailing requests includes the ride-hailing start location and the ride-hailing destination location; receiving, by the server, one or more second ride-hailing response messages returned by one or more of the one or more online ride-hailing service platforms in response to the one or more second ride-hailing requests; and returning, by the server, a first ride-hailing response message to the user terminal based on the one or more second ride-hailing response messages.

In some embodiments, the sending a second ride-hailing request to one or more online ride-hailing service platforms corresponding to the one or more online ride-hailing service providers according to the one or more transport capacity types and the one or more online ride-hailing service providers comprises determining, according to the one or more transport capacity types and the one or more online ride-hailing service providers, one or more vehicle types of each of the one or more online ride-hailing service providers that provide at least one of the one or more transport capacity types; and sending the second ride-hailing request to the one or more online ride-hailing service platforms corresponding to the one or more online ride-hailing service providers according to the one or more vehicle types of each of the online ride-hailing service providers, wherein the second ride-hailing request includes the ride-hailing start location and the ride-hailing destination location.

In some embodiments, the sending a second ride-hailing request to one or more online ride-hailing service platforms corresponding to the one or more online ride-hailing service providers according to the one or more transport capacity types and the one or more online ride-hailing service providers comprises: parsing out the one or more transport capacity types and the online ride-hailing service provider in the first ride-hailing request to obtain all vehicle types of each of the online ride-hailing service providers; and sending the second ride-hailing request to the one or more online ride-hailing service platforms corresponding to the one or more online ride-hailing service providers according to all the vehicle types of each of the online ride-hailing service providers, wherein the second ride-hailing request includes the ride-hailing start location and the ride-hailing destination location.

In some embodiments, the determining, according to the one or more transport capacity types and the one or more online ride-hailing service providers, one or more vehicle types of each of the one or more online ride-hailing service providers that provide at least one of the one or more transport capacity types comprises: parsing out the one or more online ride-hailing service providers and the one or more transport capacity types from the first ride-hailing request; and determining, from a preset configuration table of transport capacity types and vehicle types of online ride-hailing service providers, the one or more vehicle types that provide at least one of the one or more corresponding transport capacity types.

In some embodiments, the sending one or more second ride-hailing requests comprises: in response to one of the online ride-hailing service platforms receiving ride-hailing requests for all vehicle types using one interface, sending one second ride-hailing request to the interface of the one online ride-hailing service platform, wherein the second ride-hailing request includes a vehicle type; in response to one of the online ride-hailing service platforms receiving ride-hailing requests for each vehicle type using a separate interface of a plurality of interfaces, sending a number of second ride-hailing requests to the interfaces of the one online ride-hailing service platform, wherein the number of the second ride-hailing requests is the same as a number of the vehicle types, and the second ride-hailing request does not include a vehicle type; and in response to one of the online ride-hailing service platforms receiving ride-hailing requests for two or more vehicle types using a first interface and receiving ride-hailing requests for one vehicle type using a second interface, sending a second ride-hailing request that includes a vehicle type to the first interface of the one online ride-hailing service platform and a second ride-hailing request that does not include a vehicle type to the second interface.

In some embodiments, the returning a first ride-hailing response message to the user terminal comprises: in response to that the one or more second ride-hailing response messages consist of one second ride-hailing response message, returning the one second ride-hailing response message to the user terminal as the first ride-hailing response message.

In some embodiments, the returning a first ride-hailing response message to the user terminal comprises: in response to that the one or more second ride-hailing response messages include two or more second ride-hailing response messages, selecting a preset quantity of second ride-hailing response messages from the received second ride-hailing response messages according to a preset recommendation policy, and returning the selected second ride-hailing response messages to the user terminal as the first ride-hailing response message.

Embodiments of the specification further provide an online ride-hailing method, including: obtaining, by a user terminal, a ride-hailing start location and a ride-hailing destination location entered by a user of the user terminal, one or more transport capacity types selected by the user through a ride-hailing user interface of the user terminal, and one or more online ride-hailing service providers providing the one or more transport capacity types; and sending, by the user terminal, a first ride-hailing request to a server, for the server to request one or more passenger carrying vehicles from one or more online ride-hailing service platforms of the one or more online ride-hailing service providers, wherein the first ride-hailing request includes the one or more transport capacity types selected by the user, the one or more online ride-hailing service providers providing the corresponding one or more transport capacity types, the ride-hailing start location, and the ride-hailing destination location.

In some embodiments, the obtaining a ride-hailing start location and a ride-hailing destination location entered by a user of the user terminal, one or more transport capacity types selected by the user through a ride-hailing user interface of the user terminal, and one or more online ride-hailing service providers providing the corresponding one or more transport capacity types comprises: obtaining two or more transport capacity types selected by the user through the ride-hailing user interface and at least one online ride-hailing service provider providing the two or more transport capacity types.

In some embodiments, the obtaining a ride-hailing start location and a ride-hailing destination location entered by a user of the user terminal, one or more transport capacity types selected by the user through a ride-hailing user interface of the user terminal, and one or more online ride-hailing service providers providing the corresponding one or more transport capacity types comprises: obtaining at least one transport capacity type selected by the user through the ride-hailing user interface and two or more online ride-hailing service providers providing the transport capacity type.

In some embodiments, the online ride-hailing method can further comprise: sending a valuation request to the server, for the server to request estimated expenses from the one or more online ride-hailing service platforms of the one or more online ride-hailing service providers, wherein the valuation request includes the ride-hailing start location and the ride-hailing destination location; and displaying, in the ride-hailing user interface, the estimated expenses requested and returned by the server according to the one or more transport capacity types and the one or more online ride-hailing service providers.

In some embodiments, the online ride-hailing method can further comprise: sending a valuation request to the server, for the server to determine estimated expenses according to the ride-hailing start location and the ride-hailing destination location; and displaying, in the ride-hailing user interface, the estimated expenses determined and returned by the server according to the one or more transport capacity types and the one or more online ride-hailing service providers.

Embodiments of the specification further provide a system for online ride-hailing, comprising a processor and a non-transitory computer-readable storage medium storing instructions executable by the processor to cause the system to perform operations comprising: receiving, by a server, a first ride-hailing request sent by a user terminal, wherein the first ride-hailing request includes one or more transport capacity types, one or more online ride-hailing service providers providing the corresponding one or more transport capacity types, a ride-hailing start location, and a ride-hailing destination location; sending, by the server, one or more second ride-hailing requests to one or more online ride-hailing service platforms corresponding to the one or more online ride-hailing service providers according to the one or more transport capacity types and the one or more online ride-hailing service providers, wherein the each of the one or more second ride-hailing request includes the ride-hailing start location and the ride-hailing destination location; receiving, by the server, one or more second ride-hailing response messages returned by one or more of the one or more online ride-hailing service platforms in response to the one or more second ride-hailing requests; and returning, by the server, a first ride-hailing response message to the user terminal based on the one or more second ride-hailing response messages.

BRIEF DESCRIPTION OF THE DRAWINGS

The foregoing and other objectives, features, and advantages will be clearer based on the descriptions of the embodiments made with reference to the accompanying drawings below. In the accompanying drawings.

DETAILED DESCRIPTION

The specification is set out below based on embodiments, but the specification is not merely limited to the embodiments. Some specified details are described in the following detailed descriptions of the specification. To avoid the essence of the specification from being confused, existing methods, procedures, and processes are not necessarily described in detail. In addition, the accompanying drawings are not necessarily drawn to scale.

When a user cannot call a vehicle using an online ride-hailing application provided by a service provider, the user needs to open an online ride-hailing application provided by another service provider to call or reserve a vehicle, which increases ride-hailing operation costs for the user and causes inconvenience to the user. Embodiments of the specification provide an online ride-hailing method that may perform online ride-hailing more conveniently and quickly and make a ride-hailing experience simpler, quicker, and lower in costs. Embodiments of the specification may improve the success rate of ride-hailing and reduce the ride-hailing waiting time of the user.

Figure 1A:
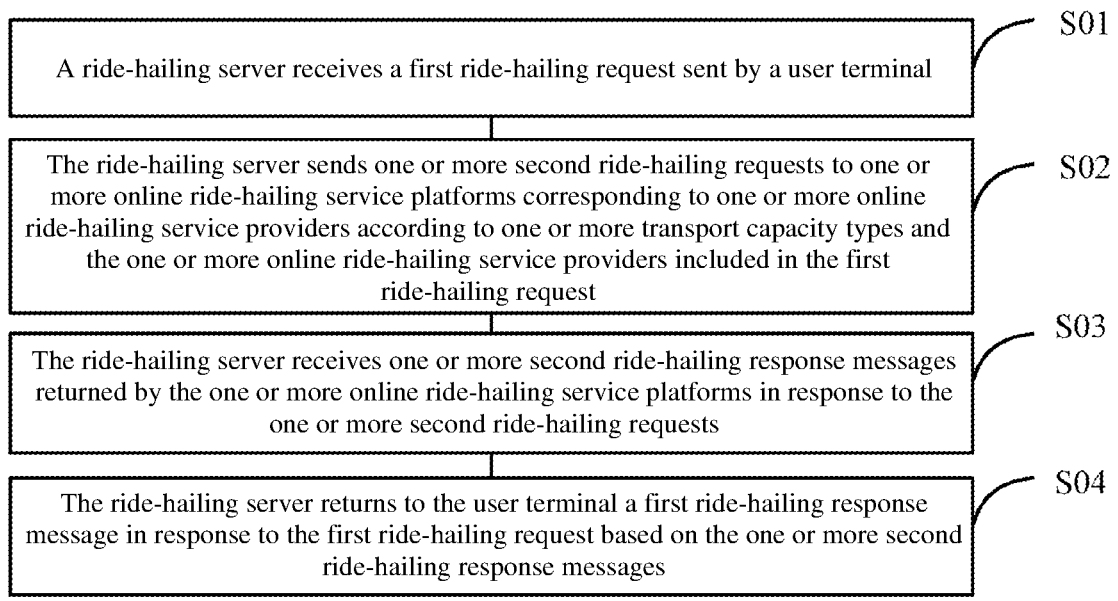
FIG. 1a is a flowchart of an example online ride-hailing method, according to some embodiments of the specification.

Some embodiments of the specification provide an online ride-hailing method. FIG. 1a is a flowchart of an example online ride-hailing method, according to some embodiments of the specification. As shown in FIG. 1a, the method includes the following steps: step S01, step S02, step S03, and step S04. In some embodiments, the online ride-hailing method shown in FIG. 1a can be performed by a ride-hailing server.

In step S01, a first ride-hailing request sent by a user terminal is received. In some embodiments, the first ride-hailing request can include one or more transport capacity types, one or more online ride-hailing service providers providing the corresponding one or more transport capacity types, and ride-hailing start locations and destination locations. It is appreciated that the start locations and the destination locations described in the specification can be a single location or a plurality of locations. For example, the start locations can be a collection of a single pinpoint location and a range of locations in close proximity to the pinpoint location. In some embodiments, the first ride-hailing request is received by the ride-hailing server. In some embodiments, more detailed descriptions of step S01 can be found in step S101 of FIG. 1b.

Referring back to FIG. 1a, in step S02, one or more second ride-hailing requests are sent to online ride-hailing service platforms corresponding to the one or more online ride-hailing service providers according to the one or more transport capacity types and the one or more online ride-hailing service providers. In some embodiments, each of the one or more second ride-hailing requests includes the ride-hailing start locations and destination locations.

In some embodiments, after receiving the first ride-hailing request, the ride-hailing server can analyze the first ride-hailing request and parse out information from the first ride-hailing request. In some embodiments, the information in the first ride-hailing request includes the one or more transport capacity types, the one or more online ride-hailing service providers providing the corresponding one or more transport capacity types, and the ride-hailing start locations and destination locations.

In some embodiments, the one or more transport capacity types included in the first ride-hailing request may not be a vehicle type. As a result, the one or more vehicle types providing the corresponding one or more transport capacity types of the one or more online ride-hailing service providers may be determined according to a preset configuration table of transport capacity types and vehicle types of online ride-hailing service providers. In some embodiments, when the one or more transport capacity types included in the first ride-hailing request is a vehicle type, the one or more transport capacity types included in the first ride-hailing request may be directly parsed out to obtain the one or more vehicle types.

In some embodiments, step S02 further includes determining, according to the one or more transport capacity types and the one or more online ride-hailing service providers, one or more vehicle types providing the corresponding one or more transport capacity types of the one or more online ride-hailing service providers. In some embodiments, step S02 further includes parsing out the one or more transport capacity types and the one or more online ride-hailing service providers in the first ride-hailing request to obtain all vehicle types of each online ride-hailing service provider.

In some embodiments, step S02 further includes sending the one or more second ride-hailing requests to the one or more online ride-hailing service platforms of the corresponding one or more online ride-hailing service providers according to all the vehicle types of each online ride-hailing service provider. In some embodiments, each of the one or more second ride-hailing requests includes the ride-hailing start locations and destination locations.

Figure 1B:
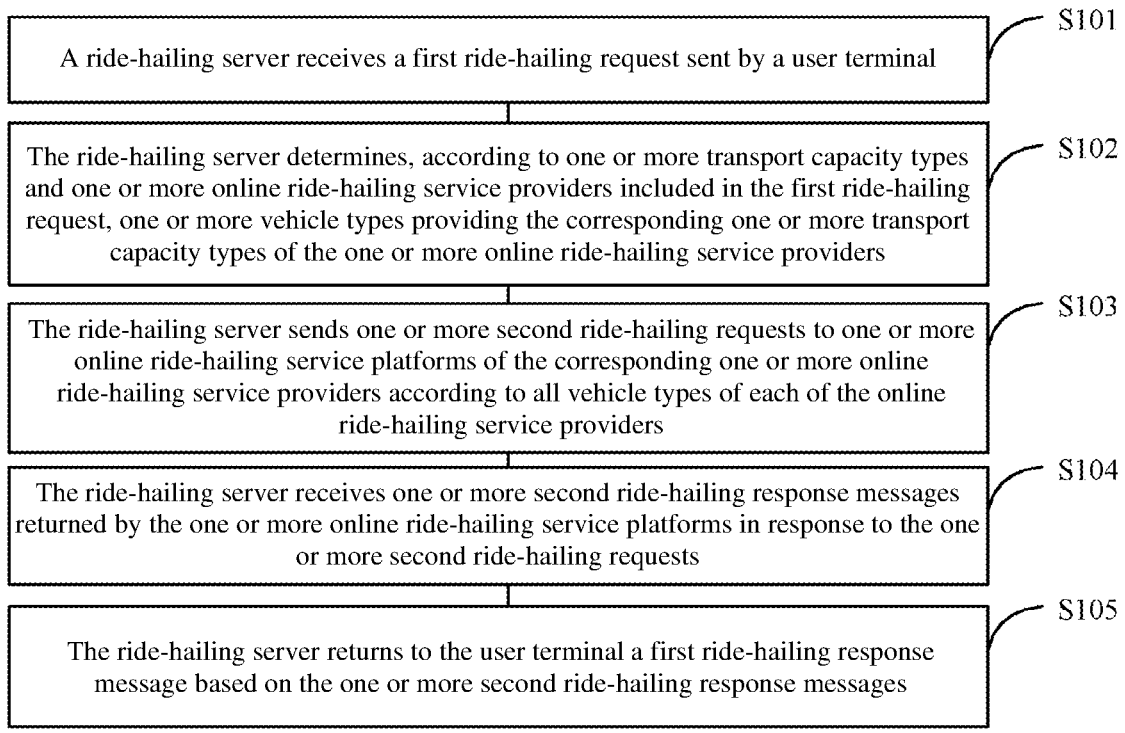
FIG. 1b is a flowchart of an example online ride-hailing method, according to some embodiments of the specification.

In some embodiments, more detailed descriptions of step S02 can be found in step S102 and step S103 of FIG. 1b.

Referring back to FIG. 1a, in step S03 one or more second ride-hailing response messages are received, where the one or more second ride-hailing response messages are returned by the one or more online ride-hailing service platforms in response to the one or more second ride-hailing requests. In some embodiments, more detailed descriptions of step S03 can be found in step S104 of FIG. 1b.

Referring back to FIG. 1a, in step S04, a first ride-hailing response message in response to the first ride-hailing request is returned to the user terminal based on the one or more second ride-hailing response messages. In some embodiments, more detailed descriptions of step S04 can be found in step S105 of FIG. 1b.

Embodiments of the specification further provide a more specific implementation of an online ride-hailing method. FIG. 1b is a flowchart of an example online ride-hailing method, according to some embodiments of the specification. As shown in FIG. 1b, the method can include the following steps: step S101, step S102, step S103, step S104, and step S105.

In step S101 a ride-hailing server receives a first ride-hailing request sent by a user terminal. In some embodiments, the user terminal may be a client device, such as a smartphone. In some embodiments, a ride-hailing application is installed on the user terminal, and the ride-hailing application may be an online ride-hailing application dedicated to online ride-hailing, or may be another type of application (e.g., map navigation application) into which an online ride-hailing function is integrated. In some embodiments, using a ride-hailing user interface provided by the ride-hailing application, a user can select information such as one or more transport capacity types, one or more online ride-hailing service providers, and ride-hailing start locations and destination locations. In some embodiments, the ride-hailing application can generate a first ride-hailing request according to the information selected by the user, where the first ride-hailing request can include the one or more transport capacity types, the one or more online ride-hailing service providers providing the corresponding one or more transport capacity types, and the ride-hailing start locations and destination locations. In some embodiments, the ride-hailing application can send the first ride-hailing request to the ride-hailing server through the user terminal on which the ride-hailing application is installed. In some embodiments, the ride-hailing application and the ride-hailing server may be provided and operated by the same service provider.

Figure 2:
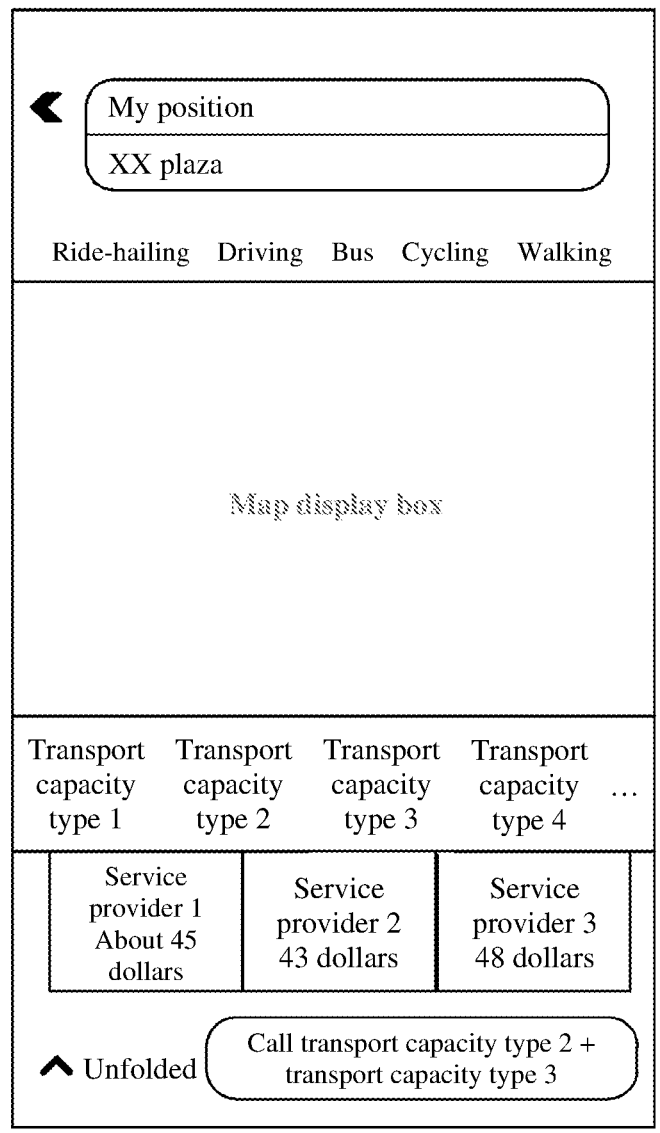
FIG. 2 is a diagram of an example user interface, according to some embodiments of the specification.

Embodiments of the specification further provide ride-hailing user interfaces. FIG. 2 is a diagram of an example user interface, according to some embodiments of the specification. It is appreciated that the user interface shown in FIG. 2 can be used in the online ride-hailing methods shown in FIG. 1a and FIG. 1b. As shown in FIG. 2, a start point of the ride-hailing (e.g., start location) is "my position," and an end point (e.g., destination location) is "XX plaza." In some embodiments, as shown in FIG. 2, the one or more transport capacity types may include a transport capacity type 1, a transport capacity type 2, a transport capacity type 3, etc. and the one or more online ride-hailing service providers may include a service provider 1, a service provider 2, a service provider 3, etc.

In some embodiments, as shown in FIG. 2, at least one selectable transport capacity type and at least one online ride-hailing service provider providing each transport capacity type may be provided to the user through the ride-hailing user interface. For example, as shown in FIG. 2, transport capacity types can include taxi, economy, comfort, luxury, business, etc. and these transport capacity types may be displayed to the user for the user to select.

Figure 3:
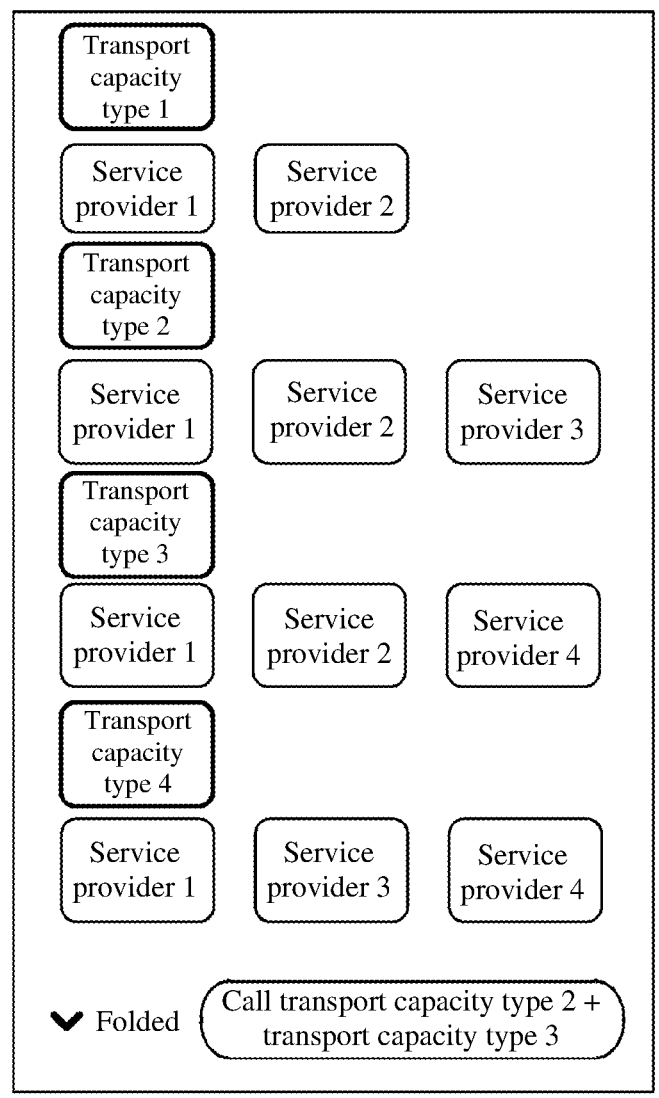
FIG. 3 is a diagram of an example user interface, according to some embodiments of the specification.

FIG. 3 is a diagram of an example user interface, according to some embodiments of the specification. It is appreciated that the user interface shown in FIG. 3 can be used in the online ride-hailing methods shown in FIG. 1a and FIG. 1b. As shown in FIG. 3, the one or more transport capacity types may include a transport capacity type 1, a transport capacity type 2, a transport capacity type 3, etc. and the one or more online ride-hailing service providers may include a service provider 1, a service provider 2, a service provider 3, etc.

In some embodiments, as shown in FIG. 3, at least one selectable transport capacity type and at least one online ride-hailing service provider providing each transport capacity type may be provided to the user through the ride-hailing user interface. For example, transport capacity types can include taxi, economy, comfort, luxury, business, etc. and these transport capacity types may be displayed to the user for the user to select.

In some embodiments, as shown in FIG. 2 and FIG. 3, the first ride-hailing request may be a real-time ride-hailing request, or a timed ride-hailing request reserved for a specific time. If the first ride-hailing request is a timed ride-hailing request, the first ride-hailing request may further include a reserved time.

Referring back to FIG. 1b, in step S102, the ride-hailing server determines, according to the one or more transport capacity types and the one or more online ride-hailing service providers included in the first ride-hailing request, one or more vehicle types providing the corresponding one or more transport capacity types of the one or more online ride-hailing service providers.

In some embodiments, after receiving the first ride-hailing request, the ride-hailing server can analyze the first ride-hailing request and parse out information included in the first ride-hailing request, such as the one or more transport capacity types, the one or more online ride-hailing service providers providing the corresponding one or more transport capacity types, and the ride-hailing start locations and destination locations. In some embodiments, the one or more vehicle type providing the corresponding one or more transport capacity types of the one or more online ride-hailing service providers involved in the first ride-hailing request can be determined according to the information parsed out, or all vehicle types of each online ride-hailing service provider can be obtained according to the parsed out information.

In some embodiments, the one or more transport capacity types included in the first ride-hailing request are in a one-to-one correspondence to the one or more vehicle types, or the one or more transport capacity types are the one or more vehicle types. As a result, the one or more vehicle types providing the corresponding one or more transport capacity types of the one or more online ride-hailing service providers may be directly obtained from the first ride-hailing request or the information parsed out from the first ride-hailing request.

In some embodiments, the one or more vehicle types providing the corresponding one or more transport capacity types of the one or more online ride-hailing service providers may be determined according to a preset configuration table of transport capacity types and vehicle types of online ride-hailing service providers. For example, the one or more online ride-hailing service providers and the one or more transport capacity types can be parsed out from the received first ride-hailing request, and the one or more vehicle types providing the corresponding one or more transport capacity types of the one or more online ride-hailing service providers can be found from the preset configuration table of transport capacity types and vehicle types of online ride-hailing service providers. In some embodiments, this determining manner is preferred in a case where the one or more transport capacity types are not fully in a one-to-one correspondence to the one or more vehicle types.

In step S103, the ride-hailing server sends one or more second ride-hailing requests to one or more online ride-hailing service platforms of corresponding one or more online ride-hailing service providers according to all vehicle types of each online ride-hailing service provider.

In some embodiments, after determining all the vehicle types of each online ride-hailing service provider, the ride-hailing server may request to reserve a vehicle from each online ride-hailing service provider. For example, the ride-hailing server may generate at least one second ride-hailing request for each of the one or more online ride-hailing service providers, and send the at least one second ride-hailing request to each of the one or more online ride-hailing service platforms. In some embodiments, the generated second ride-hailing request includes the ride-hailing start locations and destination locations.

In some embodiments, when the ride-hailing server sends the one or more second ride-hailing requests to the one or more online ride-hailing service platforms of the one or more online ride-hailing service providers, whether each second ride-hailing request includes a vehicle type may be determined according to a type of an interface of the online ride-hailing service platform, where the interface receives the ride-hailing request.

In some embodiments, if one of the online ride-hailing service platforms receives ride-hailing requests for all vehicle types by using one interface, one second ride-hailing request is sent to the interface of the online ride-hailing service platform of the online ride-hailing service provider. In some embodiments, the second ride-hailing request further includes a vehicle type.

In some embodiments, if one of the online ride-hailing service platforms receives ride-hailing requests for each vehicle type by using one interface (e.g., a separate interface of a plurality of interfaces), a number of second ride-hailing requests sent to the interface of the online ride-hailing service platform of the online ride-hailing service provider can be the same as a number of the vehicle types. In some embodiments, the second ride-hailing requests do not include a vehicle type.

In some embodiments, if one of the online ride-hailing service platforms receives ride-hailing requests for two or more vehicle types using a first interface and receives ride-hailing requests for one vehicle type using a second interface, a second ride-hailing request sent to the first interface of the online ride-hailing service platform of the online ride-hailing service provider can include a vehicle type, and a second ride-hailing request sent to the second interface may not include a vehicle type.

In step S104, the ride-hailing server receives one or more second ride-hailing response messages returned by the online ride-hailing service platform in response to the one or more second ride-hailing requests.

In some embodiments, the online ride-hailing service platform broadcasts, according to the received one or more second ride-hailing requests, a vehicle reservation message to one or more vehicles of a corresponding vehicle type, and returns the one or more second ride-hailing response messages to the ride-hailing server when a vehicle responds to the vehicle reservation message. In some embodiments, at least one of the returned one or more second ride-hailing response messages at least include response vehicle information. For example, the response vehicle information can include contact information, a license plate number, a vehicle type, or a vehicle color.

In step S105, the ride-hailing server returns to the user terminal a first ride-hailing response message based on the second ride-hailing response message.

In some embodiments, the ride-hailing server receives the one or more second ride-hailing response messages, and returns a first ride-hailing response message to the user terminal according to the received one or more second ride-hailing response messages.

In some embodiments, if only one second ride-hailing response message is returned in response to the one or more second ride-hailing requests, the second ride-hailing response message is returned to the user terminal as the first ride-hailing response message in response to the first ride-hailing request.

In some embodiments, if two or more second ride-hailing response messages are returned in response to the one or more second ride-hailing requests, one or more of the two or more second ride-hailing response messages can be selected from the received second ride-hailing response messages. For example, a preset quantity of the two or more second ride-hailing response messages can be selected according to a present recommendation policy. The selected second ride-hailing response messages can be returned to the user terminal as the first ride-hailing response message in response to the first ride-hailing request. In some embodiments, the preset recommendation policy may include selecting one or more response messages with a lower price, one or more response messages with a faster responding time, etc. In some embodiments, all of the second ride-hailing response messages can be selected and returned to the user terminal as the first ride-hailing response message.

In some embodiments, the first ride-hailing response message includes response vehicle information. In some embodiments, the response vehicle information includes contact information, an online ride-hailing service provider returning at least one of the one or more second ride-hailing response messages, a license plate number, a vehicle type, or a vehicle color.

In some embodiments, in step S101, the first ride-hailing request sent by the user terminal may include different situations. For example, there can be at least two transport capacity types, or there can be at least two online ride-hailing service providers. As a result, in some embodiments, when the ride-hailing server receives the first ride-hailing request sent by the user terminal, the first ride-hailing request sent by the user terminal can be received, where the first ride-hailing request includes two or more transport capacity types. In some embodiments, for each of the two or more transport capacity types, the first ride-hailing request can include at least one online ride-hailing service provider. In some embodiments, the first ride-hailing request can include the ride-hailing start locations and destination locations. In some embodiments, when the ride-hailing server receives the first ride-hailing request sent by the user terminal, the first ride-hailing request sent by the user terminal can be received, where the first ride-hailing request includes at least one transport capacity types. In some embodiments, for each of the at least one transport capacity types, the first ride-hailing request can include two or more online ride-hailing service providers. In some embodiments, the first ride-hailing request can include the ride-hailing start locations and destination locations.

Figure 4:
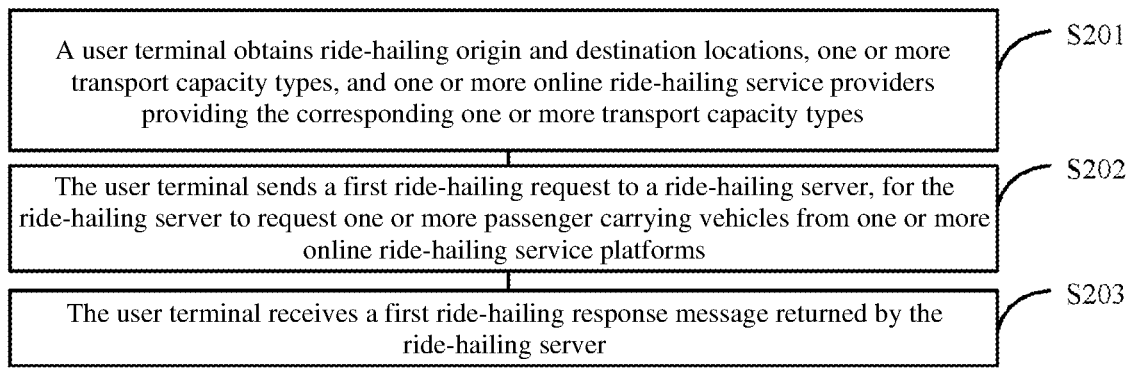
FIG. 4 is a flowchart of an example online ride-hailing method with user input, according to some embodiments of the specification.

FIG. 4 is a flowchart of an example online ride-hailing method with user input, according to some embodiments of the specification. It is appreciated that the online ride-hailing method shown in FIG. 4 can be performed by a user terminal.

As shown in FIG. 4, in step S201, the user terminal obtains ride-hailing start locations and destination locations, one or more transport capacity types, and one or more online ride-hailing service providers providing the corresponding transport capacity types. In some embodiments, the started locations and the destination locations are entered by the user. In some embodiments, the one or more transport capacity types are selected by a user through a ride-hailing user interface.

In some embodiments, the user terminal can obtain two or more transport capacity types selected by the user through the ride-hailing user interface and at least one online ride-hailing service provider providing the corresponding two or more transport capacity types. In some embodiments, the user terminal can obtain at least one transport capacity type selected by the user through the ride-hailing user interface and two or more online ride-hailing service providers providing one of the at least one corresponding transport capacity type.

In step S202 the user terminal sends a first ride-hailing request to a ride-hailing server, for the ride-hailing server to request one or more passenger carrying vehicles from one or more online ride-hailing service platforms of the corresponding one or more online ride-hailing service providers.

In some embodiments, the first ride-hailing request includes the one or more transport capacity types, the one or more online ride-hailing service providers providing the corresponding one or more transport capacity types, and the ride-hailing start locations and destination locations.

In some embodiments, the method of FIG. 4 further comprises step S203. In step S203, the user terminal receives a first ride-hailing response message returned by the ride-hailing server. In some embodiments, the first ride-hailing response message is returned by the ride-hailing server to the user terminal based on at least one of the one or more second ride-hailing response messages. In some embodiments, the ride-hailing server can process according to the methods shown in FIG. 1a or FIG. 1b.

In some embodiments, methods shown in FIG. 1a, FIG. 1b, and FIG. 4 can further include a process of performing valuation for ride-hailing start locations and destination locations.

In some embodiments, a valuation process can include the following. A user terminal sends a valuation request that includes ride-hailing start locations and destination locations to a ride-hailing server. The ride-hailing server requests estimated expenses from one or more online ride-hailing service platforms of the one or more online ride-hailing service providers, The ride-hailing server returns to the user terminal the estimated expenses requested by the ride-hailing server. The user terminal in a ride-hailing user interface displays the estimated expenses returned by the ride-hailing server. In some embodiments, the estimated expenses are displayed according to the corresponding one or more transport capacity types and the one or more online ride-hailing service providers.

In some embodiments, a valuation process can include the following. A valuation request that includes ride-hailing start locations and destination locations is sent to a ride-hailing server, for the ride-hailing server to determine corresponding estimated expenses according to the ride-hailing start locations and destination locations. In the ride-hailing user interface, the estimated expenses determined and returned by the ride-hailing server are displayed. In some embodiments, the estimated expenses are displayed according to the corresponding one or more transport capacity types and the one or more online ride-hailing service providers.

Figure 5:
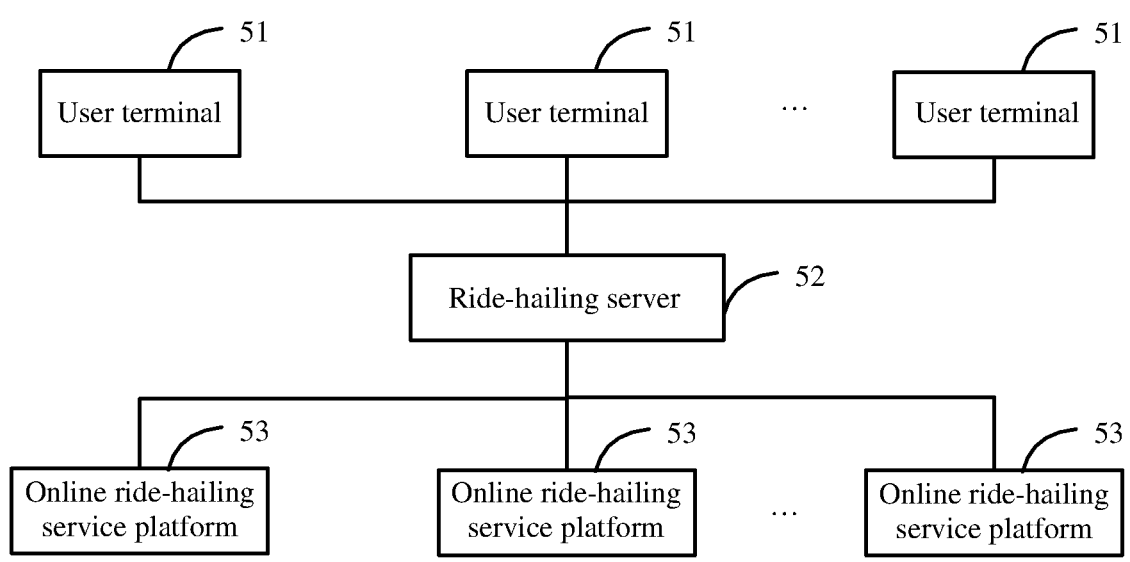
FIG. 5 is a schematic of an example online ride-hailing system, according to some embodiments of the specification.

Embodiments of the specification further provide an online ride-hailing system. FIG. 5 is a schematic of an example online ride-hailing system, according to some embodiments of the specification. As shown in FIG. 5, the online ride-hailing system can include one or more user terminals 51, a ride-hailing server 52, and at least two online ride-hailing service platforms 53. In some embodiments, the one or more user terminals 51, the ride-hailing server 52, or the at least two online ride-hailing service platforms 53 include circuitries. It is appreciated that the online ride-hailing system can perform the methods shown in FIG. 1a, FIG. 1b, and FIG. 4.

In some embodiments, the online ride-hailing service platform 53 is configured to receive one or more second ride-hailing requests sent by the ride-hailing server, and return, when a passenger carrying vehicle responds to the one or more second ride-hailing requests, one or more second ride-hailing response messages to the ride-hailing server 52.

Figure 6A:
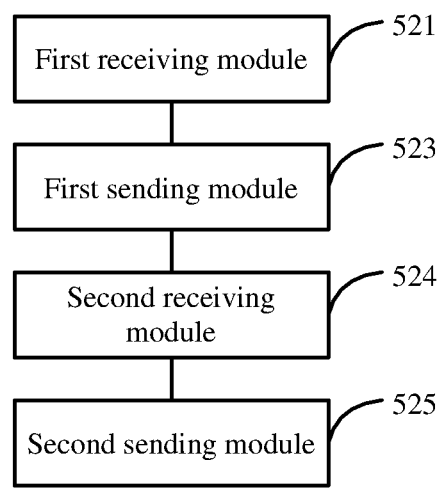
FIG. 6a is a schematic of an example online ride-hailing apparatus, according to some embodiments of the specification.

FIG. 6a is a schematic of an example ride-hailing server, according to some embodiments of the specification. As shown in FIG. 6a, the ride-hailing server can include a first receiving module 521, a first sending module 523, a second receiving module 524, and a second sending module 525. In some embodiments, the first receiving module 521, the first sending module 523, the second receiving module 524, or the second sending module 525 includes circuitries. It is appreciated that the ride-hailing server shown in FIG. 6a can be incorporated into the ride-hailing system shown in FIG. 5 (e.g., as ride-hailing server 52).

In some embodiments, the first receiving module 521 is configured to receive a first ride-hailing request sent by a user terminal, In some embodiments, the first ride-hailing request includes one or more transport capacity types, one or more online ride-hailing service provider providing the corresponding one or more transport capacity types, and ride-hailing start locations and destination locations.

In some embodiments, the first sending module 523 is configured to send one or more second ride-hailing requests to one or more online ride-hailing service platforms of corresponding one or more online ride-hailing service providers. In some embodiments, the first sending module 523 is configured to send one or more second ride-hailing requests according to the one or more transport capacity types and the one or more online ride-hailing service providers, where each of the one or more second ride-hailing requests includes the ride-hailing start locations and destination locations.

In some embodiments, the second receiving module 524 is configured to receive one or more second ride-hailing response messages returned by at least one of the one or more online ride-hailing service platforms in response to the one or more second ride-hailing requests.

In some embodiments, the second sending module 525 is configured to return a first ride-hailing response message to the user terminal in response to the first ride-hailing request based on the one or more second ride-hailing response messages.

Figure 6B:
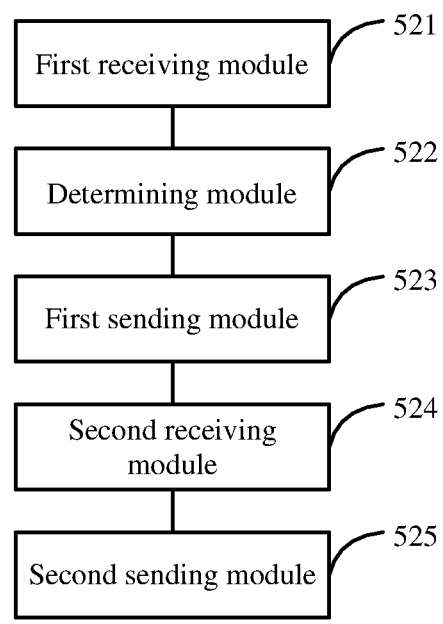
FIG. 6b is a schematic of an example ride-hailing server with a determining module, according to some embodiments of the specification.

FIG. 6b is a schematic of an example ride-hailing server with a determining module, according to some embodiments of the specification. As shown in FIG. 6b, the ride-hailing server can include a first receiving module 521, a determining module 522, a first sending module 523, a second receiving module 524, and a second sending module 525. In some embodiments, the first receiving module 521, the determining module 522, the first sending module 523, the second receiving module 524, or the second sending module 525 includes circuitries. It is appreciated that the ride-hailing server shown in FIG. 6b can be incorporated into the ride-hailing system shown in FIG. 5 (e.g., as ride-hailing server 52).

In some embodiments, the first receiving module 521 is configured to receive a first ride-hailing request sent by a user terminal. In some embodiments, the first ride-hailing request includes one or more transport capacity types, one or more online ride-hailing service providers providing the corresponding one or more transport capacity types, and ride-hailing start locations and destination locations.

In some embodiments, the determining module 522 is configured to determine one or more vehicle types providing the one or more corresponding transport capacity types of the one or more online ride-hailing service providers. In some embodiments, the determining module 522 is configured to determine the one or more vehicle types according to the one or more transport capacity types and the one or more online ride-hailing service providers included in the first ride-hailing request.

In some embodiments, the determining module 522 is configured to parse out the one or more transport capacity types and the one or more online ride-hailing service providers in the first ride-hailing request to obtain all vehicle types of each online ride-hailing service provider.

In some embodiments, the first sending module 523 is configured to send one or more second ride-hailing requests to the one or more online ride-hailing service platforms of the corresponding one or more online ride-hailing service providers. In some embodiments, the first sending module 523 is configured to send the one or more second ride-hailing requests according to all the vehicle types of each online ride-hailing service provider, where the each of the one or more second ride-hailing requests includes the ride-hailing start locations and destination locations.

In some embodiments, the second receiving module 524 is configured to receive one or more second ride-hailing response messages returned by at least one of the one or more online ride-hailing service platforms in response to the one or more second ride-hailing requests.

In some embodiments, the second sending module 525 is configured to return a first ride-hailing response message to the user terminal in response to the first ride-hailing request based on the one or more second ride-hailing response messages.

In some embodiments, the first receiving module 521 is further configured to receive the first ride-hailing request sent by the user terminal, wherein the first ride-hailing request includes two or more transport capacity types. In some embodiments, for each transport capacity type of the two or more transport capacity types, the first ride-hailing request can include at least one online ride-hailing service provider. In some embodiments, the ride-hailing request can include the ride-hailing start locations and destination locations.

In some embodiments, the first receiving module 521 is further configured to receive the first ride-hailing request sent by the user terminal, wherein the first ride-hailing request includes at least one transport capacity type. In some embodiments, for each of the at least one transport capacity type, the ride-hailing request can include two or more online ride-hailing service providers. In some embodiments, the first ride-hailing request can include the at least one transport capacity type, the ride-hailing start locations and destination locations.

In some embodiments, the determining module 522 is configured to parse out the one or more online ride-hailing service providers and the one or more transport capacity types from the first ride-hailing request. In some embodiments, the determining module 522 is configured to find or determine, from a preset configuration table of transport capacity types and vehicle types of online ride-hailing service providers, the one or more vehicle types of each of the one or more online ride-hailing service providers that provide at least one of the one or more transport capacity types.

In some embodiments, if one of the online ride-hailing service platforms receives ride-hailing requests for all vehicle types using one interface, the first sending module 523 is configured to send one second ride-hailing request to the interface of the one online ride-hailing service platform. In some embodiments, the second ride-hailing request includes a vehicle type.

In some embodiments, if one of the online ride-hailing service platforms receives ride-hailing requests for each vehicle type using one interface (e.g., a separate interface) of a one or more interfaces, a number of second ride-hailing requests can be sent to the interface of the one online ride-hailing service platform, where the number of the second ride-hailing requests may be the same as a number of the vehicle types. In some embodiments, the second ride-hailing request does not include a vehicle type.

In some embodiments, if one of the online ride-hailing service platforms receives ride-hailing requests for two or more vehicle types using a first interface and receives ride-hailing requests for one vehicle type using a second interface, a second ride-hailing request sent to the first interface of the online ride-hailing service platform can include a vehicle type, and a second ride-hailing request sent to the second interface may not include a vehicle type.

In some embodiments, if only one second ride-hailing response message is returned in response to the second ride-hailing request, the second sending module 525 is configured to return the one second ride-hailing response message to the user terminal as the first ride-hailing response message in response to the first ride-hailing request.

In some embodiments, if two or more second ride-hailing response messages are returned in response to the second ride-hailing request, the second sending module 525 is configured to select one or more of the two or more second ride-hailing response messages from the received second ride-hailing response messages, and return the selected second ride-hailing response messages to the user terminal as the first ride-hailing response message in response to the first ride-hailing request. In some embodiments, the number of the selected second ride-hailing response messages is a preset quantity selected according to a present recommendation policy.

Figure 7:
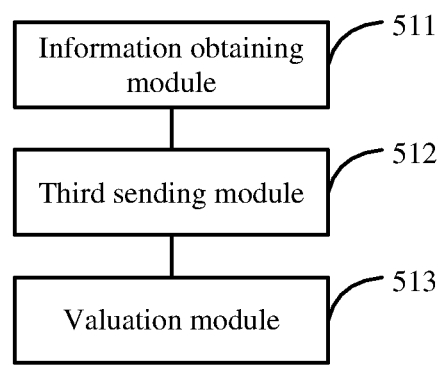
FIG. 7 is a schematic of an example ride-hailing client, according to some embodiments of the specification.

FIG. 7 is a schematic of an example ride-hailing client, according to some embodiments of the specification. As shown in FIG. 7, the ride-hailing client can include an information obtaining module 511 and a third sending module 512. In some embodiments, the information obtaining module 511 or the third sending module 512 includes circuitries. It is appreciated that the ride-hailing client shown in FIG. 7 can be incorporated into the ride-hailing system shown in FIG. 5 (e.g., as a part of ride-hailing client 52).

In some embodiments, the information obtaining module 511 is configured to obtain ride-hailing start locations and destination locations, one or more transport capacity types, and one or more online ride-hailing service providers providing the corresponding one or more transport capacity types. In some embodiments, the ride-hailing start locations and destination locations are entered by a user. In some embodiments, the one or more transport capacity types are selected by a user through one or more ride-hailing user interfaces.

In some embodiments, the third sending module 512 is configured to send a first ride-hailing request to a ride-hailing server, for the ride-hailing server to request one or more passenger carrying vehicles from one or more online ride-hailing service platforms of the corresponding one or more online ride-hailing service providers. In some embodiments, the first ride-hailing request includes the one or more transport capacity types, the one or more online ride-hailing service providers providing the corresponding one or more transport capacity types, and the ride-hailing start locations and destination locations.

In some embodiments, the information obtaining module 511 is configured to obtain two or more transport capacity types and at least one online ride-hailing service provider providing the corresponding two or more transport capacity types. In some embodiments, the two or more transport capacity types are selected by the user through the ride-hailing user interface. In some embodiments, the information obtaining module 511 is configured to obtain at least one transport capacity type and two or more online ride-hailing service providers providing the corresponding at least one transport capacity type. In some embodiments, the at least one transport capacity type is selected by the user through the ride-hailing user interface.

In some embodiments, the ride-hailing client further includes a valuation module 513. In some embodiments, the valuation module 513 is configured to send a valuation request that includes the ride-hailing start locations and destination locations to the ride-hailing server, for the ride-hailing server to request estimated expenses from the one or more online ride-hailing service platforms of the one or more online ride-hailing service providers. In some embodiments, the valuation module 513 is configured to display, in the ride-hailing user interface, the estimated expenses requested and returned by the ride-hailing server according to the corresponding one or more transport capacity types and the one or more online ride-hailing service providers.

In some embodiments, the valuation module 513 is configured to send a valuation request carrying the ride-hailing start locations and destination locations to the ride-hailing server, for the ride-hailing server to determine corresponding estimated expenses according to the ride-hailing start locations and destination locations. In some embodiments, the valuation module 513 is configured to display, in the ride-hailing user interface, the estimated expenses determined and returned by the ride-hailing server according to the corresponding one or more transport capacity types and the one or more online ride-hailing service providers. In some embodiments, the valuation module 513 includes circuitries.

According to the methods and apparatuses of the embodiments of the specification, from the first ride-hailing request sent by the user terminal, the one or more transport capacity types and the one or more online ride-hailing service providers (e.g., selected by the user) may be determined. According to the one or more transport capacity types and the one or more online ride-hailing service providers, the one or more vehicle types providing the corresponding one or more transport capacity types of the one or more online ride-hailing service providers can be determined. As a result, different types of passenger carrying vehicles of different online ride-hailing service providers can be requested or reserved, and they can be requested or reserved simultaneously. If any online ride-hailing service provider responds, the user may reserve a passenger carrying vehicle successfully. Because the user may select a plurality of online ride-hailing service providers and a plurality of transport capacity types for reservation, a suitable passenger carrying vehicle may be reserved more quickly and conveniently. A user's waiting time for vehicle reservation can be reduced, and the success rate of ride-hailing can be improved, thereby reducing or avoiding the occurrence of repeated ride-hailing processes as much as possible and optimizing the distribution of vehicle resources. In addition, the user may not need to install a plurality of ride-hailing software. As a result, the system resource overhead of the user terminal or user equipment is reduced, and only one ride-hailing client may be used. Therefore, the complexity of user operations can be reduced, and the ride-hailing operation can be made simpler.

Figure 8:
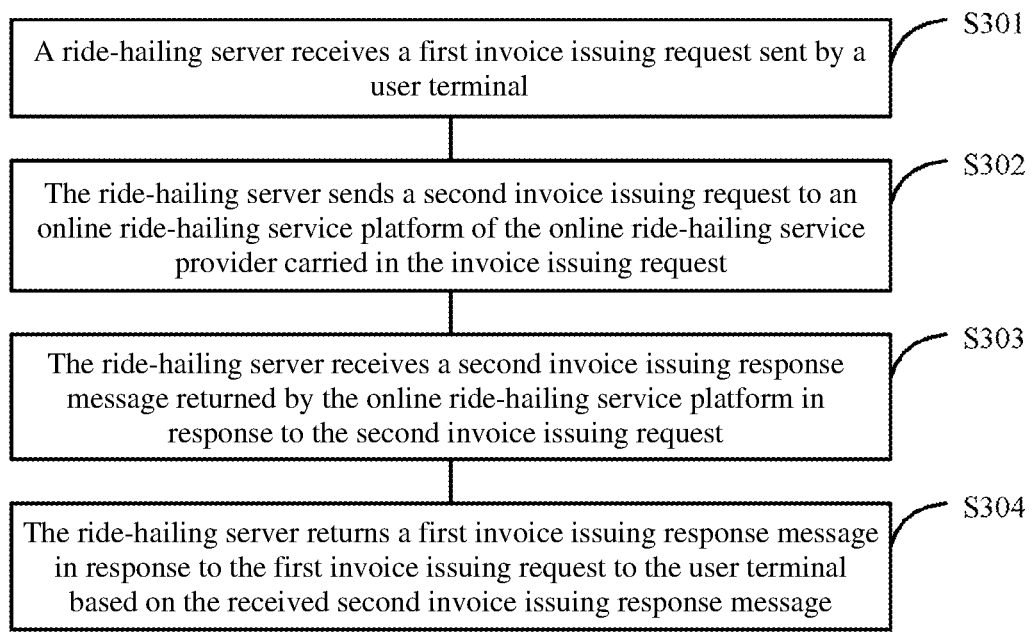
FIG. 8 is a flowchart of an example invoice issuing method by a ride-hailing server, according to some embodiments of the specification.

FIG. 8 is a flowchart of an example invoice issuing method by a ride-hailing server, according to some embodiments of the specification. As shown in FIG. 8, the invoice issuing method comprises a number of steps.

In step S301, a ride-hailing server receives a first invoice issuing request. In some embodiments, the first invoice issuing request is sent by a user terminal. In some embodiments, the invoice issuing request includes at least one piece of invoice issuing data of at least one online ride-hailing service provider.

In some embodiments, a user may select a to-be-issued ride-hailing order as invoice issuing data through an invoice issuing interaction interface of the user terminal. The user terminal can generate a first invoice issuing request according to the invoice issuing data selected by the user. In some embodiments, the first invoice issuing request includes an online ride-hailing service provider involved in the ride-hailing order and at least one piece of invoice issuing data. In some embodiments, the invoice issuing data may include related information about the order, such as an invoice amount. In some embodiments, the first invoice issuing request may further include invoice issuing information, such as a user name or a user code. In some embodiments, the invoice issuing information may be set independently, or may be included in the invoice issuing data.

In step S302, the ride-hailing server sends a second invoice issuing request to an online ride-hailing service platform of the online ride-hailing service provider included in the invoice issuing request. In some embodiments, the second ride-hailing request includes one piece of invoice issuing data.

In some embodiments, the ride-hailing server sends the second invoice issuing request to the corresponding online ride-hailing service platform according to the involved online ride-hailing service provider, where the at least one piece of invoice issuing data included in the second invoice issuing request may include information related to the order. In some embodiments, the information related to the order can include information such as an invoice amount. In some embodiments, the second invoice issuing request may further include invoice issuing information, such as the user name or the user code. In some embodiments, the invoice issuing information may be set independently, or may be included in the invoice issuing data.

In step S303, the ride-hailing server receives a second invoice issuing response message returned by the online ride-hailing service platform in response to the second invoice issuing request.

In some embodiments, the online ride-hailing service platform receives the second invoice issuing request and may return a second invoice issuing response message to the ride-hailing server.

In step S304, the ride-hailing server returns a first invoice issuing response message in response to the first invoice issuing request to the user terminal based on the received second invoice issuing response message.

In some embodiments, after receiving the second invoice issuing response message, the ride-hailing server may return a first invoice issuing response message to the user terminal.

Figure 9:
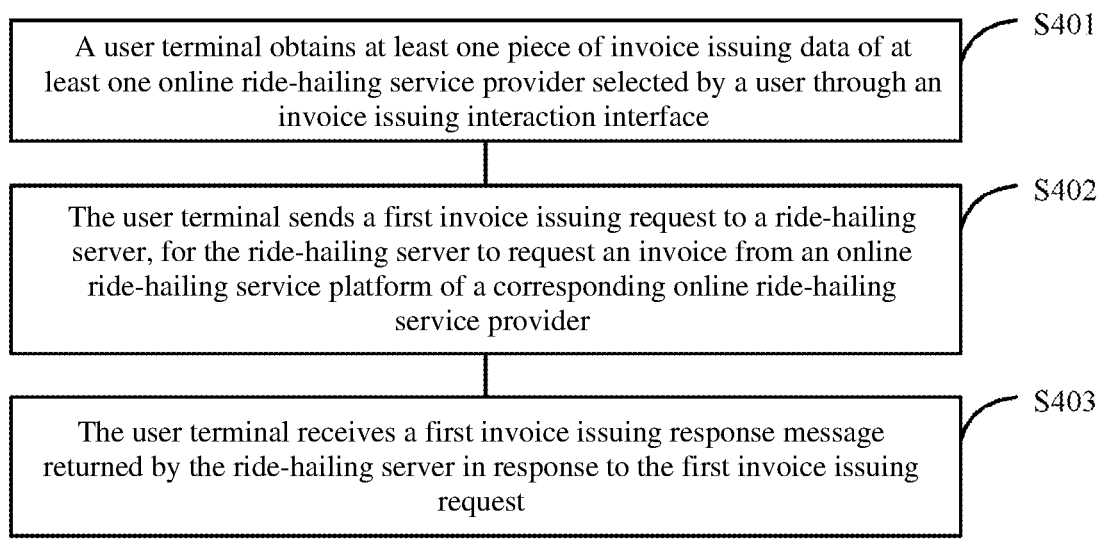
FIG. 9 is a flowchart of an example invoice issuing method by a user terminal, according to some embodiments of the specification.

FIG. 9 is a flowchart of an example invoice issuing method by a user terminal, according to some embodiments of the specification. As shown in FIG. 9, the invoice issuing method can include a number of steps.

In step S401, a user terminal obtains at least one piece of invoice issuing data of at least one online ride-hailing service provider. In some embodiments, the at least one online ride-hailing service provider is selected by a user of an invoice issuing interaction interface.

In some embodiments, the user may select a to-be-issued ride-hailing order as invoice issuing data through an invoice issuing interaction interface of the user terminal, and may select at least one piece of invoice issuing data of one or more online ride-hailing service providers.

In step S402, the user terminal sends a first invoice issuing request to a ride-hailing server, for the ride-hailing server to request an invoice from an online ride-hailing service platform of a corresponding online ride-hailing service provider, In some embodiments, the first invoice issuing request includes the at least one piece of invoice issuing data of the at least one online ride-hailing service provider.

In some embodiments, the user terminal can generate a first invoice issuing request according to the invoice issuing data selected by the user and send the first invoice issuing request to the ride-hailing server.

In some embodiments, the method shown in FIG. 9 can further include a step S403. In step S403, the user terminal receives a first invoice issuing response message returned by the ride-hailing server in response to the first invoice issuing request. In some embodiments, the process conducted by the ride-hailing server is similar to the method shown in FIG. 8.

Figure 10:
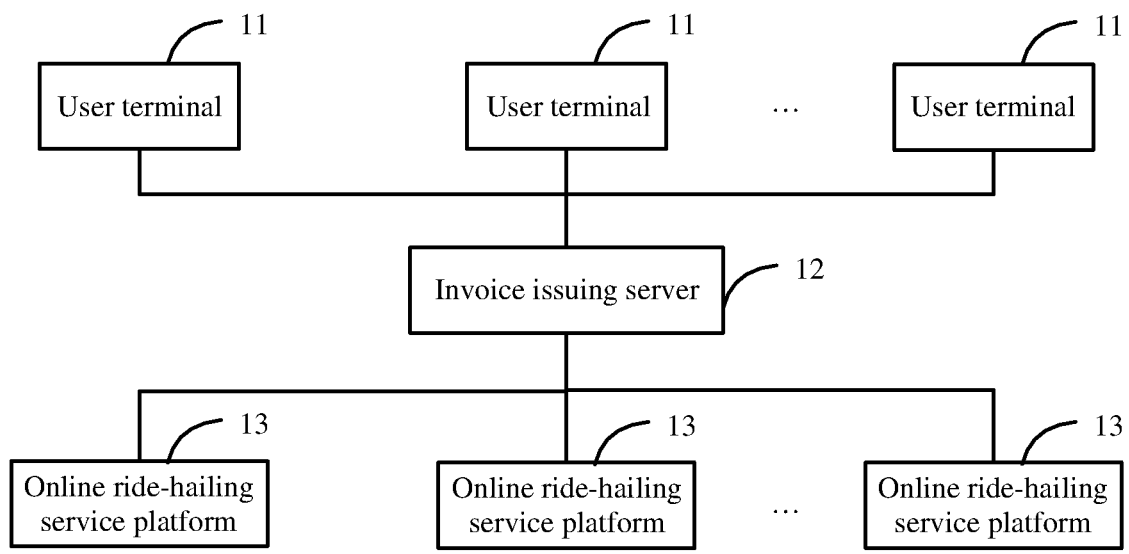
FIG. 10 is a schematic of an example invoice issuing system, according to some embodiments of the specification.

FIG. 10 is a schematic of an example invoice issuing system, according to some embodiments of the specification. As shown in FIG. 10, the system can include a user terminal 11, an invoice issuing server 12, and at least two online ride-hailing service platforms 13.

In some embodiments, the online ride-hailing service platform 13 is configured to receive a second invoice issuing request sent by the invoice issuing server, and return a second invoice issuing response message to the invoice issuing server.

Figure 11:
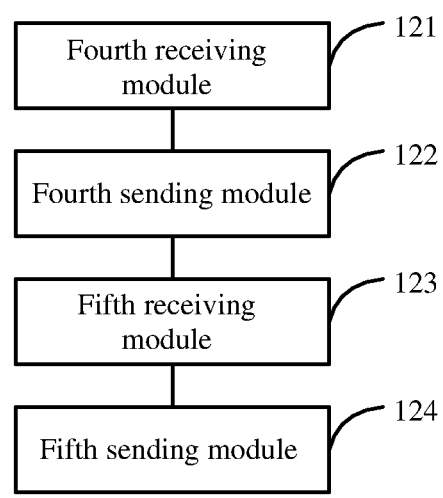
FIG. 11 is a schematic of an example invoice issuing apparatus, according to some embodiments of the specification.

In some embodiments, an invoice issuing apparatus is disposed in the invoice issuing server 12. FIG. 11 is a schematic of an example invoice issuing apparatus, according to some embodiments of the specification. As shown in FIG. 11, the invoice issuing apparatus can include a fourth receiving module 121, a fourth sending module 122, a fifth receiving module 123, and a fifth sending module 124. It is appreciated that the invoice issuing apparatus can be incorporated into the invoice issuing system shown in FIG. 10 (e.g., as a part of invoice issuing server 12).

In some embodiments, the fourth receiving module 121 shown in FIG. 11 is configured to receive a first invoice issuing request sent by a user terminal. In some embodiments, the invoice issuing request includes at least one piece of invoice issuing data of at least one online ride-hailing service provider.

In some embodiments, the fourth sending module 122 is configured to send a second invoice issuing request to an online ride-hailing service platform of the online ride-hailing service provider included in the invoice issuing request. In some embodiments, the second ride-hailing request includes at least one piece of invoice issuing data.

In some embodiments, the fifth receiving module 123 is configured to receive a second invoice issuing response message returned by the online ride-hailing service platform in response to the second invoice issuing request.

In some embodiments, the fifth sending module 124 is configured to return a first invoice issuing response message to the user terminal in response to the first invoice issuing request. In some embodiments, the first invoice issuing response message is returned based on the received second invoice issuing response message.

Figure 12:
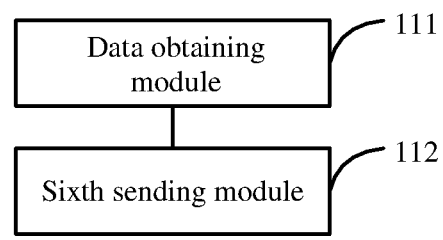
FIG. 12 is a schematic of an example invoice issuing client, according to some embodiments of the specification.

Referring back to FIG. 10, in some embodiments, an invoice issuing client is disposed in the user terminal 11. FIG. 12 is a schematic of an example invoice issuing client, according to some embodiments of the specification. As shown in FIG. 12, the invoice issuing client can includes a data obtaining module 111 and a sixth sending module 112. It is appreciated that the invoice issuing client can be incorporated into the invoice issuing system shown in FIG. 10 (e.g., as a part of user terminal 11).

In some embodiments, the data obtaining module 111 is configured to obtain at least one piece of invoice issuing data of at least one online ride-hailing service provider. In some embodiments, the at least one piece of invoice issuing data of at least one online ride-hailing service provide is selected by a user through an invoice issuing interaction interface.

In some embodiments, the sixth sending module 112 is configured to send a first invoice issuing request to a ride-hailing server, for the ride-hailing server to request an invoice from an online ride-hailing service platform of a corresponding online ride-hailing service provider. In some embodiments, the first invoice issuing request includes the at least one piece of invoice issuing data of the at least one online ride-hailing service provider.

According to the technical solutions provided in the specification, when a user performs online ride-hailing, the user may select a plurality of transport capacity types and select a plurality of online ride-hailing service providers for each transport capacity type. The user can do so by using one ride-hailing application installed on a user terminal, and send the plurality of transport capacity types and the plurality of online ride-hailing service providers selected for each transport capacity type by the user to a ride-hailing server through a first ride-hailing request. The ride-hailing server may determine, according to the first ride-hailing request sent by the user terminal, the transport capacity types and the online ride-hailing service providers selected by the user, so as to determine vehicle types providing the corresponding transport capacity types of each involved online ride-hailing service provider. Therefore, embodiments of the specification enable the user to request different types of passenger carrying vehicles of different online ride-hailing service providers from the different online ride-hailing service providers simultaneously by using the one ride-hailing application installed on the user terminal. In this case, provided that any online ride-hailing service provider responds, the user may call a passenger carrying vehicle successfully. As a result, the user may call a suitable passenger carrying vehicle more conveniently and quickly, a ride-hailing waiting time can be reduced, and the success rate of ride-hailing can be improved. In addition, the user may not need to install a plurality of pieces of ride-hailing software. Therefore, the system resource overhead of the user terminal is reduced, and passenger carrying vehicles may be requested simultaneously from different online ride-hailing service providers using one ride-hailing application. The complexity of user operations and ride-hailing operation costs can be reduced, and the ride-hailing operation is made simpler.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

Embodiments of the specification further provide a computer storage medium, where the computer storage medium (e.g., a non-transitory computer storage medium) stores computer-executable instructions. The computer-executable instructions, when executed by a processor, implement the processes, methods, and algorithms described in the preceding sections.

Embodiments of the specification further provide a server that includes a memory, a processor, and a computer program stored on the memory and executable on the processor, where the processor, when executing the program, implements the processes, methods, and algorithms described in the preceding sections.

Embodiments of the specification further provide a user terminal that includes a memory, a processor, and a computer program stored on the memory and executable on the processor, where the processor, when executing the program, implements the processes, methods, and algorithms described in the preceding sections.

According to the foregoing methods and apparatuses of the embodiments of the specification, each involved online ride-hailing service provider may be determined according to the first invoice issuing request sent by the user terminal. The invoice issuing request can be sent to the online ride-hailing service platform of each online ride-hailing service provider. A plurality of different online ride-hailing service providers may be requested simultaneously to issue an invoice more quickly and conveniently. As a result, an invoice issuing operation can be simplified and an invoice issuing operation time can be reduced.

Unless specifically stated otherwise, a term such as processing, computing, calculating, determining, displaying, or the like may refer to an action and/or process of one or more processing or computing systems or similar devices. The action and/or process may manipulate and transform data represented as physical (for example, electronic) quantities within a register or memory of a processing system into other data similarly represented as physical quantities within the register or memory of the processing system, or other such information storage, transmission or display devices. Information and signals may be represented by using any one of a plurality of different technologies and methods. For example, data, instructions, commands, information, signals, bits, symbols, and chips mentioned throughout the foregoing descriptions may be represented by using voltages, currents, electromagnetic waves, magnetic fields or particles, optical fields or particles, or any combination thereof.

It is appreciated that a specific sequence or hierarchy of the steps in the disclosed process is an example method. It is appreciated that based on design preferences that the specific sequence or hierarchy of the steps in the process may be rearranged without departing from the protection scope of the specification. The appended method claims provide elements of various steps in an exemplary sequence, and are not intended to be limited to the specific sequence or hierarchy.

In the foregoing detailed descriptions, various features are combined in a single implementation solution to simplify the specification. The embodiments of the specification may have more, fewer, or alternative steps or features than the those disclosed herein. Therefore, the appended claims are particularly and clearly incorporated into the detailed descriptions, where each claim is independently used as an individual preferred implementation solution of this specification.

A person skilled in the art should further understand that, various illustrative logic blocks, modules, circuits, and algorithmic steps described with reference to the embodiments of the specification may all be implemented as electronic hardware, computer software or a combination thereof. To clearly explain the interchangeability between hardware and software, the foregoing generally describes the various components, blocks, modules, circuits, and steps around the functions thereof. Whether the functions are implemented as hardware or software depends on specific applications and design constraint conditions applied to the entire system. A person skilled in the art may implement the described functions for each specific application flexibly. However, the implementation decision should not be interpreted as departing from the protection scope of the specification.

Steps of methods or algorithms described with reference to the embodiments of this specification may be directly reflected as hardware, software modules executed by a processor, or a combination thereof. The software module may be stored in a random access memory (RAM), a flash memory, a read-only memory (ROM), an electrically programmable ROM (EPROM), an electrically erasable programmable ROM (EEPROM), a register, a hard disk, a removable disk, a compact disc ROM (CD-ROM), or any other form of storage medium well-known in the art. For example, a storage medium is connected to a processor, for the processor to read information from the storage medium or write information to the storage medium. Certainly, the storage medium may be a component of the processor. The processor and the storage medium may be located in an application-specific integrated circuit ("ASIC"). The ASIC may be located in a user terminal. Certainly, the processor and the storage medium may be used as discrete assemblies existing in a user terminal.

For software implementation, the technology described in this specification may be implemented using modules (for example, processes and functions) performing the functions of this specification. Software code may be stored in a memory unit and executed by a processor. The memory unit may be implemented in the processor, or may be implemented outside the processor. In the latter case, the memory unit is coupled to the processor in a communication manner by various means, which are publicly known in the art.

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

The various features and processes described above may be used independently of one another or may be combined in various ways. All possible combinations and sub-combinations are intended to fall within the scope of this specification. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

What is claimed is:

1. An online ride-hailing method, comprising:
   receiving, by a server, a first ride-hailing request from a user that comprises a plurality of transportation capacity types and a plurality of online-ride-hailing service providers providing the plurality of transportation capacity types, a ride-hailing start location, and a ride-hailing destination location wherein the plurality of transportation capacity types include one or more of taxi, economy, comfort, luxury, or business;
   transforming, by the server, the first ride-hailing request into a plurality of second ride-hailing requests and sending the plurality of second ride-hailing requests to the plurality of online ride-hailing service providers, wherein the transforming and sending comprise, for each of the plurality of online ride-hailing service providers:
   determining vehicle types being requested from the online ride-hailing service provider that provide rides of the plurality of transportation capacity types;
   in response to two or more vehicle types being requested from the online ride-hailing service provider, transforming the first ride-hailing request into a second ride-hailing request by including the two or more vehicle types, the ride-hailing start location, and the ride-hailing destination location, and sending the second ride-hailing request to a first interface of the online ride-hailing service provider;
   in response to one vehicle type being request from the online ride-hailing service provider, transforming the first ride-hailing request into the second ride-hailing request by excluding the one vehicle type, but including the ride-hailing start location and the ride-hailing destination location, and sending the second ride-hailing request to a second interface of the online ride-hailing service provider;
   receiving, by the server, one or more second ride-hailing response messages returned by one or more of the plurality of online ride-hailing service providers in response to the plurality of second ride-hailing requests; and
   returning, by the server, a first ride-hailing response message to a user terminal based on the one or more second ride-hailing response messages.

2. The method according to claim 1, wherein the method further comprises:
   parsing out the plurality of transport capacity types and the online ride-hailing service provider in the first ride-hailing request to obtain all vehicle types of each of the online ride-hailing service providers.

3. The method according to claim 1, wherein:
   the first ride-hailing request includes two or more transport capacity types and at least one online ride-hailing service provider for each transport capacity type.

4. The method according to claim 1, wherein the determining vehicle types of the online ride-hailing service provider that provide the plurality of transportation capacity types comprises:
   parsing out the online ride-hailing service providers and the transport capacity types from the first ride-hailing request; and
   determining, from a preset configuration table of transport capacity types and vehicle types of online ride-hailing service providers, the vehicle types that provide at least one of corresponding transport capacity types.

5. The method according to claim 1, wherein returning a first ride-hailing response message to the user terminal comprises:
   in response to that the one or more second ride-hailing response messages consist of one second ride-hailing response message, returning the one second ride-hailing response message to the user terminal as the first ride-hailing response message.

6. The method according to claim 1, wherein returning a first ride-hailing response message to the user terminal comprises:
   in response to that the one or more second ride-hailing response messages include two or more second ride-hailing response messages, selecting a preset quantity of second ride-hailing response messages from the received second ride-hailing response messages according to a preset recommendation policy, and returning the selected second ride-hailing response messages to the user terminal as the first ride-hailing response message.

7. A system for online ride-hailing, comprising a processor and a non-transitory computer-readable storage medium storing instructions executable by the processor to cause the system to perform operations comprising:
   receiving a first ride-hailing request from a user that comprises a plurality of transportation capacity types and a plurality of online-ride-hailing service providers providing the plurality of transportation capacity types, a ride-hailing start location, and a ride-hailing destination location wherein the plurality of transportation capacity types include one or more of taxi, economy, comfort, luxury, or business;

transforming the first ride-hailing request into a plurality of second ride-hailing requests and sending the plurality of second ride-hailing requests to the plurality of online ride-hailing service providers, wherein the transforming and sending comprise, for each of the plurality of online ride-hailing service providers:
  determining vehicle types being requested from the online ride-hailing service provider that provide rides of the plurality of transportation capacity types;
  in response to two or more vehicle types being requested from the online ride-hailing service provider, transforming the first ride-hailing request into a second ride-hailing request by including the two or more vehicle types, the ride-hailing start location, and the ride-hailing destination location, and sending the second ride-hailing request to a first interface of the online ride-hailing service provider;
  in response to one vehicle type being request from the online ride-hailing service provider, transforming the first ride-hailing request into the second ride-hailing request by excluding the one vehicle type, but including the ride-hailing start location and the ride-hailing destination location, and sending the second ride-hailing request to a second interface of the online ride-hailing service provider;
receiving one or more second ride-hailing response messages returned by one or more of the plurality of online ride-hailing service providers in response to the plurality of second ride-hailing requests; and
returning a first ride-hailing response message to a user terminal based on the one or more second ride-hailing response messages.

8. The system of claim 7, wherein the operations further comprise:

parsing out the plurality of transport capacity types and the online ride-hailing service provider in the first ride-hailing request to obtain all vehicle types of each of the online ride-hailing service providers.

9. The system of claim 7, wherein the determining vehicle types of the online ride-hailing service provider that provide the plurality of transportation capacity types comprises:
  parsing out the online ride-hailing service providers and the transport capacity types from the first ride-hailing request; and
  determining, from a preset configuration table of transport capacity types and vehicle types of online ride-hailing service providers, the vehicle types that provide at least one of corresponding transport capacity types.

10. The system of claim 7, wherein returning a first ride-hailing response message to the user terminal comprises:
  in response to that the one or more second ride-hailing response messages consist of one second ride-hailing response message, returning the one second ride-hailing response message to the user terminal as the first ride-hailing response message.

11. The system of claim 7, wherein returning a first ride-hailing response message to the user terminal comprises:
  in response to that the one or more second ride-hailing response messages include two or more second ride-hailing response messages, selecting a preset quantity of second ride-hailing response messages from the received second ride-hailing response messages according to a preset recommendation policy, and returning the selected second ride-hailing response messages to the user terminal as the first ride-hailing response message.

* * * * *